(12) United States Patent  (10) Patent No.: US 8,762,877 B2
Loberg et al.  (45) Date of Patent: *Jun. 24, 2014

(54) CREATION AND MODIFICATION OF VALID FUNCTIONAL DESIGN LAYOUTS

(75) Inventors: Barrie A. Loberg, Millarville (CA); Dale Boden, Calgary (CA)

(73) Assignee: Ice Edge Business Solutions Ltd., Calgary (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/444,890

(22) PCT Filed: Feb. 13, 2009

(86) PCT No.: PCT/CA2009/000190
§ 371 (c)(1), (2), (4) Date: Jun. 24, 2009

(87) PCT Pub. No.: WO2009/100542
PCT Pub. Date: Aug. 20, 2009

(65) Prior Publication Data
US 2010/0306681 A1    Dec. 2, 2010

Related U.S. Application Data

(63) Continuation-in-part of application No. 11/204,421, filed on Aug. 16, 2005.

(60) Provisional application No. 61/028,409, filed on Feb. 13, 2008, provisional application No. 60/602,233, filed on Aug. 17, 2004.

(51) Int. Cl.
*G06F 3/048* (2006.01)

(52) U.S. Cl.
USPC ........... 715/775; 715/757; 715/764; 715/771; 715/852

(58) Field of Classification Search
USPC .................. 715/764, 757, 771, 852, 775, 765
See application file for complete search history.

(56) References Cited

U.S. PATENT DOCUMENTS 4,970,666 A * 11/1990 Welsh et al. .................. 345/423
5,111,392 A * 5/1992 Malin ............................. 705/29

(Continued)

FOREIGN PATENT DOCUMENTS

EP    1098244        9/2001
EP    1098244 A2    9/2001

(Continued)

OTHER PUBLICATIONS ask-search-q=building+design+functional+component+n.*

(Continued)

*Primary Examiner* — Boris Pesin
*Assistant Examiner* — John Heffington
(74) *Attorney, Agent, or Firm* — Workman Nydegger

(57) ABSTRACT

A software application can capture product parameters and attributes in order to allow a non-expert user to create a valid functional system layout in a design space. To enable accurate layouts, the software application can automatically apply all applicable components, connectors, rules, attributes, codes, and behaviors to each component/design element in the design space. The intelligent, object-oriented software can apply rules and behaviors automatically, not only providing an accurate, valid layout, but also optimizing the layout. The intelligent, object-oriented software can recognize required changes effected by a user-driven change, and automatically resolve the layout design.

21 Claims, 8 Drawing Sheets

(56) References Cited

U.S. PATENT DOCUMENTS

| | | | |
|---|---|---|---|
| 5,255,207 A * | 10/1993 | Cornwell | 703/1 |
| 5,293,479 A * | 3/1994 | Quintero et al. | 715/841 |
| 5,514,232 A | 5/1996 | Burns | |
| 5,555,357 A * | 9/1996 | Fernandes et al. | 345/441 |
| 5,572,639 A | 11/1996 | Gantt | |
| 5,576,965 A | 11/1996 | Akasaka et al. | |
| 5,588,098 A | 12/1996 | Chen et al. | |
| 5,625,827 A | 4/1997 | Krause | |
| 5,684,713 A | 11/1997 | Asada et al. | |
| 5,740,341 A * | 4/1998 | Oota et al. | 345/420 |
| 5,764,518 A | 6/1998 | Collins | |
| 5,796,401 A * | 8/1998 | Winer | 345/619 |
| 5,870,771 A | 2/1999 | Oberg | |
| 5,894,310 A | 4/1999 | Arsenault et al. | |
| 5,977,982 A | 11/1999 | Lauzon | |
| 5,995,107 A | 11/1999 | Berteig | |
| 6,014,503 A * | 1/2000 | Nagata et al. | 703/1 |
| 6,016,147 A * | 1/2000 | Gantt | 345/420 |
| 6,020,885 A | 2/2000 | Honda | |
| 6,037,945 A | 3/2000 | Loveland | |
| 6,052,669 A * | 4/2000 | Smith et al. | 705/26.5 |
| 6,253,167 B1 | 6/2001 | Matsuda | |
| 6,285,369 B1 * | 9/2001 | Kross et al. | 345/419 |
| 6,292,810 B1 | 9/2001 | Richards | |
| 6,401,237 B1 | 6/2002 | Ishikawa | |
| 6,459,435 B1 * | 10/2002 | Eichel | 345/588 |
| 6,466,239 B2 | 10/2002 | Ishikawa | |
| 6,493,679 B1 | 12/2002 | Rappaport | |
| 6,509,906 B1 | 1/2003 | Awe et al. | |
| 6,556,211 B2 * | 4/2003 | Davis | 345/582 |
| 6,573,903 B2 * | 6/2003 | Gantt | 345/619 |
| 6,611,725 B1 * | 8/2003 | Harrison et al. | 700/98 |
| 6,628,279 B1 * | 9/2003 | Schell et al. | 345/420 |
| 6,629,065 B1 * | 9/2003 | Gadh et al. | 703/1 |
| 6,662,144 B1 | 12/2003 | Normann et al. | |
| 6,690,981 B1 | 2/2004 | Kawachi | |
| 6,701,288 B1 | 3/2004 | Normann | |
| 6,721,684 B1 | 4/2004 | Saebi | |
| 6,721,769 B1 * | 4/2004 | Rappaport et al. | 707/737 |
| 6,727,925 B1 * | 4/2004 | Bourdelais | 715/852 |
| 6,772,168 B2 | 8/2004 | Ardoin et al. | |
| 6,847,853 B1 * | 1/2005 | Vinciarelli et al. | 700/97 |
| 6,859,768 B1 * | 2/2005 | Wakelam et al. | 703/1 |
| 6,868,297 B1 * | 3/2005 | Rimoldi et al. | 700/98 |
| 6,888,542 B1 | 5/2005 | Clauss | |
| 6,904,393 B2 * | 6/2005 | Schwalb et al. | 703/1 |
| 6,912,293 B1 * | 6/2005 | Korobkin | 382/100 |
| 6,912,429 B1 * | 6/2005 | Bilger | 700/19 |
| 6,922,701 B1 | 7/2005 | Ananian et al. | |
| 6,971,063 B1 | 11/2005 | Rappaport | |
| 6,985,832 B2 | 1/2006 | Saebi | |
| 6,999,102 B2 | 2/2006 | Felser et al. | |
| 7,019,753 B2 | 3/2006 | Rappaport | |
| 7,039,569 B1 * | 5/2006 | Haws et al. | 703/7 |
| 7,042,440 B2 | 5/2006 | Pryor et al. | |
| 7,062,454 B1 | 6/2006 | Giannini | |
| 7,062,722 B1 * | 6/2006 | Carlin et al. | 715/850 |
| 7,080,096 B1 | 7/2006 | Imamura | |
| 7,085,697 B1 | 8/2006 | Rappaport | |
| 7,096,173 B1 | 8/2006 | Rappaport | |
| 7,127,378 B2 * | 10/2006 | Hoffman et al. | 703/1 |
| 7,130,775 B2 * | 10/2006 | Takagaki et al. | 703/1 |
| 7,155,228 B2 | 12/2006 | Rappaport | |
| 7,155,375 B1 * | 12/2006 | Rimoldi et al. | 703/2 |
| 7,171,208 B2 | 1/2007 | Rappaport | |
| 7,200,639 B1 | 4/2007 | Yoshida | |
| 7,216,092 B1 | 5/2007 | Weber | |
| 7,243,054 B2 | 7/2007 | Rappaport | |
| 7,246,044 B2 | 7/2007 | Imamura | |
| 7,246,045 B1 | 7/2007 | Rappaport | |
| 7,249,005 B2 | 7/2007 | Loberg | |
| 7,266,768 B2 | 9/2007 | Ferlitsch | |
| 7,277,572 B2 * | 10/2007 | MacInnes et al. | 382/154 |
| 7,277,830 B2 | 10/2007 | Loberg | |
| 7,299,168 B2 | 11/2007 | Rappaport | |
| 7,299,416 B2 | 11/2007 | Jaeger | |
| 7,340,383 B2 | 3/2008 | Mayuzumi | |
| 7,353,192 B1 | 4/2008 | Ellis | |
| 7,567,844 B2 * | 7/2009 | Thomas et al. | 700/19 |
| 7,574,323 B2 * | 8/2009 | Rappaport et al. | 702/182 |
| 7,583,275 B2 * | 9/2009 | Neumann et al. | 345/633 |
| 7,587,302 B2 | 9/2009 | Arvin | |
| 7,643,966 B2 | 1/2010 | Adachi | |
| 7,644,363 B2 * | 1/2010 | Rogerson et al. | 715/715 |
| 7,650,260 B1 * | 1/2010 | Rimoldi et al. | 703/2 |
| 7,661,959 B2 | 2/2010 | Green | |
| 7,663,644 B2 * | 2/2010 | Foster | 345/619 |
| 7,676,348 B2 * | 3/2010 | Okada | 703/2 |
| 7,733,351 B1 * | 6/2010 | Sinnard et al. | 345/582 |
| 7,788,068 B2 | 8/2010 | Mangon | |
| 7,814,436 B2 | 10/2010 | Schrag | |
| 7,822,584 B1 | 10/2010 | Saebi | |
| 7,823,074 B2 | 10/2010 | Takemura | |
| 7,856,342 B1 | 12/2010 | Kfouri | |
| 7,877,237 B1 | 1/2011 | Saebi | |
| 7,996,756 B2 | 8/2011 | Eilers | |
| 8,108,267 B2 | 1/2012 | Varon | |
| 8,132,123 B2 | 3/2012 | Schrag | |
| 8,134,553 B2 | 3/2012 | Saini | |
| 8,185,219 B2 | 5/2012 | Gilbert | |
| 8,244,025 B2 | 8/2012 | Davis | |
| 8,255,338 B1 * | 8/2012 | Brittan | 705/400 |
| 8,271,336 B2 * | 9/2012 | Mikurak | 705/22 |
| 8,276,088 B2 * | 9/2012 | Ke et al. | 715/768 |
| 8,285,707 B2 * | 10/2012 | Day et al. | 707/713 |
| 8,290,849 B2 * | 10/2012 | Eisler et al. | 705/37 |
| 8,301,527 B2 * | 10/2012 | Tarbox et al. | 705/35 |
| 8,314,799 B2 | 11/2012 | Pelletier | |
| 8,332,401 B2 * | 12/2012 | Hull et al. | 707/736 |
| 8,332,827 B2 * | 12/2012 | Edde et al. | 717/135 |
| 8,335,789 B2 * | 12/2012 | Hull et al. | 707/736 |
| 8,352,218 B2 | 1/2013 | Balla | |
| 8,386,918 B2 * | 2/2013 | Do et al. | 715/230 |
| RE44,054 E * | 3/2013 | Kim | 715/706 |
| 8,402,473 B1 * | 3/2013 | Becker et al. | 719/313 |
| 8,423,391 B2 * | 4/2013 | Hessedenz | 705/7.12 |
| 8,442,850 B2 * | 5/2013 | Schorr et al. | 705/7.12 |
| 8,462,147 B2 | 6/2013 | Sugden | |
| 8,499,250 B2 | 7/2013 | Wetzer | |
| 8,508,539 B2 | 8/2013 | Vlietinck | |
| 8,510,382 B2 * | 8/2013 | Purdy et al. | 709/205 |
| 8,510,672 B2 | 8/2013 | Loberg | |
| 8,521,737 B2 * | 8/2013 | Hart et al. | 707/736 |
| 8,549,440 B2 * | 10/2013 | Ganz | 715/849 |
| 8,566,419 B2 * | 10/2013 | Purdy et al. | 709/217 |
| 8,600,989 B2 * | 12/2013 | Hull et al. | 707/736 |
| 8,626,877 B2 * | 1/2014 | Greene et al. | 709/220 |
| 8,645,973 B2 * | 2/2014 | Bosworth et al. | 719/320 |
| 8,650,179 B2 * | 2/2014 | Driesch et al. | 707/713 |
| 2001/0024211 A1 | 9/2001 | Kudukoli | |
| 2001/0047250 A1 | 11/2001 | Schuller | |
| 2001/0047251 A1 | 11/2001 | Kemp | |
| 2002/0010589 A1 | 1/2002 | Nashida | |
| 2002/0012007 A1 * | 1/2002 | Twigg | 345/677 |
| 2002/0032546 A1 * | 3/2002 | Imamura et al. | 703/1 |
| 2002/0069221 A1 | 6/2002 | Rao | |
| 2002/0083076 A1 | 6/2002 | Wucherer | |
| 2002/0085041 A1 | 7/2002 | Ishikawa | |
| 2002/0091739 A1 | 7/2002 | Ferlitsch | |
| 2002/0093538 A1 | 7/2002 | Carlin | |
| 2002/0123812 A1 * | 9/2002 | Jayaram et al. | 700/98 |
| 2002/0144204 A1 | 10/2002 | Milner | |
| 2002/0188678 A1 | 12/2002 | Edecker | |
| 2002/0196285 A1 | 12/2002 | Sojoodi | |
| 2004/0012542 A1 | 1/2004 | Bowsher | |
| 2004/0027371 A1 | 2/2004 | Jaeger | |
| 2004/0075689 A1 * | 4/2004 | Schleiss et al. | 345/771 |
| 2004/0098691 A1 | 5/2004 | Teig | |
| 2004/0113945 A1 * | 6/2004 | Park et al. | 345/765 |
| 2004/0117746 A1 | 6/2004 | Narain et al. | |
| 2004/0145614 A1 | 7/2004 | Takagaki | |
| 2004/0153824 A1 | 8/2004 | Devarajan | |
| 2004/0204903 A1 | 10/2004 | Saebi | |
| 2004/0205519 A1 | 10/2004 | Chapel | |

(56) References Cited

U.S. PATENT DOCUMENTS

| | | | |
|---|---|---|---|
| 2004/0263512 A1* | 12/2004 | Santodomingo et al. | 345/428 |
| 2005/0041028 A1* | 2/2005 | Coutts | 345/441 |
| 2005/0065951 A1 | 3/2005 | Liston | |
| 2005/0071135 A1 | 3/2005 | Vredenburgh | |
| 2005/0081161 A1* | 4/2005 | MacInnes et al. | 715/765 |
| 2005/0268245 A1* | 12/2005 | Gipps et al. | 715/762 |
| 2006/0020430 A1* | 1/2006 | Gipps et al. | 703/1 |
| 2006/0020431 A1* | 1/2006 | Gipps et al. | 703/1 |
| 2006/0028695 A1 | 2/2006 | Knighton | |
| 2006/0036513 A1* | 2/2006 | Whatley et al. | 705/27 |
| 2006/0041842 A1 | 2/2006 | Loberg | |
| 2006/0174209 A1 | 8/2006 | Barros | |
| 2006/0206623 A1* | 9/2006 | Gipps et al. | 709/238 |
| 2006/0271378 A1* | 11/2006 | Day | 705/1 |
| 2007/0088704 A1 | 4/2007 | Bourne | |
| 2007/0115275 A1 | 5/2007 | Cook et al. | |
| 2007/0168325 A1 | 7/2007 | Bourne | |
| 2007/0180425 A1 | 8/2007 | Storms | |
| 2007/0188488 A1 | 8/2007 | Choi | |
| 2007/0204241 A1 | 8/2007 | Glennie et al. | |
| 2007/0219645 A1* | 9/2007 | Thomas et al. | 700/29 |
| 2007/0240049 A1* | 10/2007 | Rogerson et al. | 715/700 |
| 2007/0250295 A1 | 10/2007 | Murray | |
| 2007/0256391 A1* | 11/2007 | Mifsud et al. | 52/745.05 |
| 2007/0256392 A1* | 11/2007 | Mifsud et al. | 52/745.05 |
| 2007/0260345 A1* | 11/2007 | Mifsud et al. | 700/97 |
| 2007/0260432 A1* | 11/2007 | Okada | 703/1 |
| 2007/0261318 A1* | 11/2007 | Mifsud et al. | 52/79.1 |
| 2007/0262040 A1* | 11/2007 | Mifsud et al. | 212/324 |
| 2007/0264107 A1* | 11/2007 | Mifsud et al. | 414/296 |
| 2007/0264108 A1* | 11/2007 | Mifsud et al. | 414/302 |
| 2007/0265724 A1* | 11/2007 | Mifsud et al. | 700/115 |
| 2007/0271073 A1* | 11/2007 | Mifsud et al. | 703/1 |
| 2007/0271870 A1* | 11/2007 | Mifsud et al. | 52/745.2 |
| 2007/0294622 A1 | 12/2007 | Sterner | |
| 2008/0036769 A1* | 2/2008 | Coutts | 345/441 |
| 2008/0052618 A1 | 2/2008 | McMillan | |
| 2008/0143884 A1 | 6/2008 | Foster | |
| 2008/0159616 A1* | 7/2008 | Fellinger | 382/141 |
| 2008/0275674 A1 | 11/2008 | Reghetti et al. | |
| 2008/0282166 A1 | 11/2008 | Fillman | |
| 2008/0303844 A1 | 12/2008 | Reghetti et al. | |
| 2008/0309678 A1 | 12/2008 | Reghetti et al. | |
| 2009/0113349 A1 | 4/2009 | Zohar | |
| 2009/0119039 A1* | 5/2009 | Banister et al. | 702/62 |
| 2009/0138826 A1 | 5/2009 | Barros | |
| 2009/0148050 A1 | 6/2009 | Reghetti et al. | |
| 2009/0210487 A1 | 8/2009 | Westerhoff | |
| 2009/0248184 A1 | 10/2009 | Steingart | |
| 2009/0273598 A1 | 11/2009 | Reghetti et al. | |
| 2010/0017733 A1 | 1/2010 | Barros | |
| 2010/0121614 A1 | 5/2010 | Reghetti et al. | |
| 2010/0122196 A1 | 5/2010 | Wetzer | |
| 2010/0138762 A1 | 6/2010 | Reghetti et al. | |
| 2010/0185514 A1 | 7/2010 | Glazer | |
| 2011/0004880 A1* | 1/2011 | Schumacher et al. | 718/102 |
| 2011/0078169 A1* | 3/2011 | Sit | 707/769 |
| 2011/0169826 A1 | 7/2011 | Elsberg | |
| 2011/0258573 A1 | 10/2011 | Wetzer | |
| 2011/0320966 A1 | 12/2011 | Edecker | |
| 2012/0005353 A1 | 1/2012 | Edecker | |
| 2012/0331422 A1 | 12/2012 | High | |

FOREIGN PATENT DOCUMENTS

| | | |
|---|---|---|
| JP | EP1204046 A1 | 5/2002 |
| WO | WO9003618 A1 | 4/1990 |
| WO | WO9322741 A2 | 11/1993 |
| WO | WO02075597 | 9/2002 |
| WO | WO2005033985 | 4/2005 |
| WO | 2006018740 | 2/2006 |
| WO | WO2006018744 A2 | 2/2006 |
| WO | WO2007093060 A1 | 8/2007 |
| WO | 2007106873 | 9/2007 |
| WO | 2009100538 | 8/2009 |

OTHER PUBLICATIONS ask-search-qsrc=1&o=0&l=dir&q=building+design+elect.*
ask-search-qsrc=1&o=0&l=dir&q=building+design+inlet.*
ask-search-qsrc=1&o=0&l=dir&q=building+design+repea.*
catia-tutor-assembly-design, CATIA Tutor—Assembly Design, CATIA Handbook, Basic, no date provided.*
International Search Report and Opinion on PCT/CA2007/000241, mailed May 15, 2007.
International Search Report and Opinion on PCT/CA2009/000190, mailed Jun. 5, 2009.
International Search Report and Opinion on PCT/CA2009/000183, mailed Jun. 9, 2009.
International Search Report and Opinion on PCT/CA2009/000311, mailed Jul. 30, 2009.
Office Action Mailed Aug. 18, 2010, U.S. Appl. No. 11/577,302.
Josie Wernecke; Title: The Inventor Mentor: Programming Object Oriented 3D Graphics with Open Inventor; Release 2; Date: Jun. 19, 1997; Published on Web Site: www.cs.ualberta.cal-.
Office Action Mailed Jul. 29, 2009, U.S. Appl. No. 11/204,421.
Chan, et al.: "Design of a Walkthrough System for Indoor Environments from Floor Plans"; Proceedings of the 1998 IEEE Conference on Information Visualization, Jul. 29-31, 1998, pp. 50-57.
Office Action Mailed Oct. 18, 2006, U.S. Appl. No. 11/204,419.
Office Action Mailed Oct. 19, 2006, U.S. Appl. No. 11/204,420.
Office Action Mailed Nov. 28, 2007, U.S. Appl. No. 11/204,421.
Office Action Mailed Aug. 11, 2008, U.S. Appl. No. 11/204,421.
Office Action Mailed Dec. 23, 2008, U.S. Appl. No. 11/204,421.
Advisory Action Mailed Mar. 31, 2009, U.S. Appl. No. 11/204,421.
Advisory Action Mailed May 15, 2009, U.S. Appl. No. 11/204,421.
Edward J. Dejesus, James P. Callan, and Curtis R. Whitehead, Pearl: An Expert System for Power Supply Layout, 23rd Design Automation Conference, Paper 34.4, IEEE.
USPTO, Office Action in U.S. Appl. No. 12/444,890, mailed Oct. 27, 2011, 30 pages.
International Search Report & Written Opinion for PCT/US2010/058092 dated Jul. 27, 2011.
USPTO, Office Action in U.S. Appl. No. 12/444,886, mailed Oct. 27, 2011, 24 pages.
Marir F et al: "OSCONCAD: a model-based CAD system integrated with computer applications", Proceedings of the International Construction IT Conference, vol. 3, 1998.
Blythe, Rise of the Graphics Processor, IEEE, 2008.
U.S. Office of Personnel Management, Clear Cache, IE, 2007.
Wang, Intellectual Property Protection in Collaborative Design through Lean information Modeling and Sharing, 2006.
Lea, Community Place Architecture and Performance, 2007.
Autodesk, Maya 8.5 Shading, 2007.
CRC, Final Report Collaborative Platform. 2009.
Mental Images GmbH, RealityServer Functional Overview White Paper, 2007.
Rozansk, Software Systems Architecture Working With Stakeholders Using Viewpoints and Perspectives, 2008.
Sony, Community Place Conductor 2.0 User Manual, 1998.
Vasko, Collaborative Modeling of Web Applications for Various Stakeholders, 2009.
Gross M D: "Why can't CAD be more like Lego? CKB, a program building construction kits", Automation in Construction, Elsevier Science Publishers, Amsterdam, NL, vol. 5, No. 4, Oct. 1, 1996 pp. 285-300, XP004072247, ISSN: 0926-5805, DOI:10.1016/S0926-5805(96)00154-9.
European Search Report—Application No./Patent No. 09719352.8-1960/2252951 PCT/CA2009000311.
EPO Search Report for EP07701791 dated Aug. 21, 2012.

* cited by examiner

CREATION AND MODIFICATION OF VALID FUNCTIONAL DESIGN LAYOUTS

CROSS-REFERENCE TO RELATED APPLICATIONS

The present invention is a U.S. National Stage Application corresponding to PCT/CA2009/000190, filed on Feb. 13, 2009, entitled "Creation and Modification of Valid Functional Design Layouts," which claims the benefit of priority to U.S. Provisional Patent Application No. 61/028,409, filed on Feb. 13, 2008, entitled "Automated Layout of Electrical Components and Wiring Intent in Design Software."

The present invention is also a continuation-in-part of U.S. patent application Ser. No. 11/204,421, filed on Aug. 16, 2005, entitled "Capturing a User's Intent in Design Software", which claims the benefit of priority to U.S. Patent Provisional Application 60/602,233, filed on Aug. 17, 2004, now abandoned, entitled "Method and Apparatus for the Selection, Organization and Configuration of Products through Object Oriented Design Intent." The entire content of each of the aforementioned patent applications is incorporated herein by reference.

BACKGROUND OF THE INVENTION

1. Technical Field

This invention relates generally to systems, methods, and computer program products for modeling and design. More specifically, the present invention relates to software used to design space layouts and corresponding components.

2. Background and Relevant Art

As computerized systems have increased in popularity, so has the range of applications that incorporate computational technology. For example, architects and interior designers (or "designers") use a wide range of design software for designing the aesthetic as well as functional aspects of a given residential or commercial space. In some cases, the designer might use some software programs that are better suited for exterior design, and then use other software programs that are better suited for interior design.

For example, a designer might implement one software program to design an overall look of a building, and then use the software to design or position each of the structural components of the building, such as weight-bearing walls, trusses in a roof, and so on. The designer might then use another software program, whether separately, or as an add-on to the first software program, to design the functional components of a building, such as the electrical systems, plumbing systems, and heating, ventilating, and air conditioning (HVAC) systems. Finally, the designer might then use still a further software program to design the interior features of the building, such as functional walls, position of furniture, lighting fixtures, and so forth.

When designing the exterior and/or interior of a given residential or commercial space, the designer may need to take care that each of the elements in the design are structurally and functionally sound when built. This is because typical design software can allow spaces to be fairly configurable to suit the user's desires without specific regard in many cases to whether the design will actually function or comply with applicable codes and regulations when built. For example, one typical software design program (e.g., conventional computer-aided design or CAD programs) might allow a designer to layout an electrical circuit that is ill-suited for the number or type of electrical components and loads that the designer has included in the circuit. If the circuit were actually constructed as laid out by the designer, the circuit may be hot and be prone to overload, may be a fire hazard, or may not satisfy the requirements of applicable building codes. In a situation such as this, however, the builder might indicate to the designer that the layout is physically impossible or impractical, and ask for a redesign. This, of course, can lead to any number of inefficiencies.

For example, conventional design software is often difficult to use, and heavily dependent on the skill of a user, such that conventional software for laying out functional systems can tend to be accessible primarily or uniquely to "product experts." In general, a product expert is one who understands the product components, rules, and behaviors in relation to other components (functional and non-functional) in the layout software. Nevertheless, even product experts can err when attempting to remember all aspects of any particular component, and can fail to remember or identify a component's relationships with respect to other parts of the layout.

One of the problems with many design software programs that can lead to the design of physically or functionally impractical structures, is that many such design problems require some drawing of a space in flat, two-dimensional space. For example, an electrical wiring layout is typically designed in a plan view that emphasizes primarily only length and width from above. With views such as these, the designer will either need to independently visualize the three-dimensional spacing, or will need to perform a separate three-dimensional rendering of the design, if the software allows for it.

In addition, neither the three-dimensional rendering nor the two-dimensional drawing views are designed to accommodate necessary modifications to the objects or walls, based on real-world materials, or other important constraints. For example, a designer might use a first two-dimensional software package to place several electrical components in a work space. After which the designer may place furniture and work spaces within the same work space using another two-dimensional software package or an add-on to the first. The designer may then use another program to produce a three-dimensional rendering of the workspace. Upon reviewing the three-dimensional rendering of the workspace, the designer may find that some of the electrical components need to be repositioned relative to the furniture and work spaces or vise versa. Conventional design software typically requires changes to the electrical layout design or changes in furniture selection and placement to be made manually, which often results in a complete rework to ensure the end-user captures all of the needed changes.

For example, changing existing layouts can involve not only the manual placement of components, but also various considerations related to the changing of the walls, furniture, or other design components. Furthermore, the repositioning or replacement of functional components can require changes to the circuits, jumpers, breakers, pumps, vents, and machines supporting the components. In addition, there are several mistakes that can be made with regard to estimating installation times, as well as time and cost for manual placement, rework, and so forth.

One way that conventional software lends itself to these difficulties is that there it often has inexact or error-prone software relationships between textual versions and graphical oriented versions of components. For example, conventional layout software applications will sometimes, upon completion of a design, utilize separate databases for the graphic components and textual components used to order the product. The linking between these different databases, however, introduces another area for potential error, and requires additional time for auditing the graphical results against the textual results.

Once a design has been finalized by a designer, the designer will need to generate one or more parts lists that reflect the various dimensions and parts placed in any of the design views. An estimator (or the like) may then use the parts list for any number of cost estimate or ordering ends. Unfortunately, there is generally not a convenient way for an accurate parts list to be generated automatically from one or more design views. For example, even though a designer might use a conventional design software program to design one or more views of a space, the designer might need to independently deduce a parts list based on each of the different views. In some cases, the designer might hire another person to identify each part needed.

Accordingly, an advantage in the art can be realized with systems, methods, and computer program products that provide a designer with the ability to design spaces in a highly configurable and user-friendly manner. In particular, an advantage can be realized with systems that are configured to help ensure functional system layouts (electrical, plumbing, HVAC, etc.) are physically and functionally possible in at least one respect.

BRIEF SUMMARY OF THE INVENTION

Implementations of the present invention overcome one or more problems in the art with systems, methods, and computer program products configured to capture product information, such as component attributes and parameters, to allow a non-expert user to design a valid functional system layout within a design space. In particular, implementations of the present invention automatically associate product parameters and attributes to both functional and non-functional design components, including all applicable connectors, rules, features, characteristics, and behaviors. Based upon the components and their associated attributes and parameters, implementations of the present invention can automatically apply rules and behaviors to help create a functional system layout in a design space that is physically and functionally valid. Furthermore, implementations of the present invention can optimize the parameters of the functional system layout.

For example, in accordance with an implementation of the present invention a method of automatically configuring user input within a computerized environment to represent a design or layout of components within a design space can involve identifying one or more source components in a design space. The method can further involve receiving user input regarding one or more functional components that are configured to receive flow from the one or more source components. Also, the method can involve automatically creating a valid functional system layout within the design space by optimizing the parameters of functional system lines connecting the one or more source components and the one or more functional components.

Additionally, a method in accordance with an implementation of the present invention of automatically configuring user input in a computerized environment to represent a design or layout of components within a design space can involve receiving user input regarding the placement of one or more functional components within a design space. The method can also involve receiving user input regarding the placement of one or more source components within the design space. The method can then involve populating functional system lines with optimized characteristics. The functional system lines can connect the one or more source components and the one or more functional components. The method can further involve receiving additional user input regarding the placement, relocation, or change of one or more of a non-functional design component, a functional component, or a source component within the design space. Additionally, the method can resolve the functional system lines in view of the additional user input.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. One will appreciate that elements of similar structures or functions are generally represented by like reference numerals for illustrative purposes throughout the Figures. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1A:
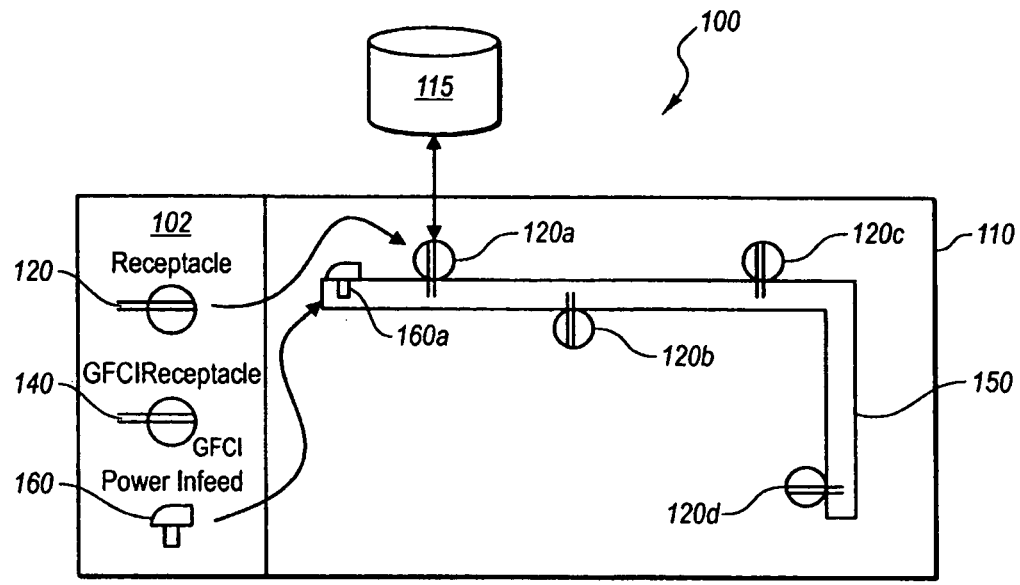
FIG. 1A illustrates a conceptual diagram of a user interface and one or more components of a design software program when a user enters input into a design space in accordance with an implementation of the present invention.

The present invention extends to systems, methods, and computer program products configured to capture product information, such as component attributes and parameters, to allow a non-expert user to design a valid functional system layout within a design space. In particular, implementations of the present invention automatically associate product parameters and attributes to both functional and non-functional design components, including all applicable connectors, rules, features, characteristics, and behaviors. Based upon the components and their associated attributes and parameters, implementations of the present invention can automatically apply rules and behaviors to help create a functional system layout in a design space that is physically and functionally valid. Furthermore, implementations of the present invention can optimize the parameters of the functional system layout.

For example, based on the placement of source components (power sources, gas and water valves, etc.) and functional components (outlets, vents, sinks, showers, etc.) implementations of the present invention can optimize the routing of functional lines and conduits therebetween. Implementations of the present invention can also optimize the routing of functional lines and conduits by reducing the length of needed functional lines and conduits, reducing the space requirements needed for the functional system, reducing the number of joints and connectors, and adjusting the functional layout to correspond to product attributes, such as stock lengths etc.

One will thus appreciate that because the systems, methods, and computer program products of the present invention include design components (function and non-functional) that include associated product attributes and parameters, a non-expert can easily and efficiently design a valid functional design layout. Furthermore, implementations of the present invention can apply rules and behaviors automatically, not only providing an accurate, valid layout, but also allowing change at any time without rework. Implementations of the present invention can also recognize required changes effected by user driven changes, and automatically resolve the functional layout design, including required component substitutions and dimensional changes, to help maintain validity.

Furthermore, implementations of the present invention can represent the design space in two-dimensional graphics, three-dimensional graphics, and textual information. Thus, a user can easily and quickly toggle between different views or representations to gain a complete understanding of the design space and design components therein. Each of these separate views can be representations of the same dataset. Thus, one will appreciate that implementations of the present invention can eliminate the need to audit between information sources. Furthermore, because each representation can be based on the same dataset, all three representations can be resolved and modified instantly and simultaneously.

As mentioned above, implementations of the present invention can allow a non-expert user to design a valid functional system layout within a design space. As used herein, the term "functional system" refers to one or more of an electrical system, plumbing system, HVAC system, or the like. The Figures and corresponding text included hereafter illustrate examples of creating valid electrical system layouts for ease of description. One will appreciate, however, that the systems, methods, and computer product programs can create valid layouts of other functional systems, such as for example, plumbing, and HVAC systems.

As used herein, the term "source component" refers to a source or "inlet" of a functional system within a design space (e.g., workspace, room, floor, or building). For example, a source component in an electrical system can include an electrical power infeed, main power line, etc. Similarly, a source component in a plumbing system can include a main water-line, water valve, etc. A source component in a HVAC system can include a main gas-valve, a furnace, or an air conditioning unit, etc. One will appreciate that a source component can vary depending upon the design space being used. For example in an electrical system, a source component for a building can include the main power line entering the building, while the source component for a workspace can include a power infeed.

Additionally, as used herein, the term "functional component" refers broadly to any component of a functional system. In some instances, the term "functional component" refers to an "outlet" of a functional system. For example, in an electrical system a functional component can comprise an electrical receptacle, a junction box, or an electrical fixture, etc. A functional component in a plumbing system can include a sink, a drinking fountain, or a toilet, etc. Along similar lines, a functional component in a HVAC system can include a ventilation register, etc.

Furthermore, as used herein the term "functional system line" refers to the connectors and conduits needed to interconnect the functional components and source components of a functional system. Thus, in an electrical system, the functional system lines can include, for example, electrical wiring, jumpers, junction boxes, circuit breakers, etc. In a plumbing system, the functional system lines can include, for example, piping, venting, pumps, etc. Functional system lines in a HVAC system can include ducts, vents, intakes, etc.

In at least one implementation, the system, methods, and computer products of the present invention allow a user to select functional and source components from a product menu, which the user can then apply to design components within a design space, such as for example, a wall, modular furniture, a panel, or similar components. One will appreciate that a user can also select the design components from a product menu, or the user can import them into the software system from another software program. For example, FIG. 1A illustrates an exemplary user interface 100 for a design software program in accordance with an implementation of the present invention.

As shown in FIG. 1A, the user interface 100 can provide a user with a selection portion 102 with a list of images or icons, such as a receptacle icon 120, a ground fault circuit interrupter (GFCI) receptacle icon 140, a power infeed icon 160, and the like. The icons can represent items that the user can place in a design space 110 portion of the user interface 100. In at least one implementation, the icon is a symbol representing the item (e.g., a recognized functional component symbol). In alternative implementations, the icon can be an image associated with the item (e.g., image of receptacle 120). Thus, the icons 120, 140, 160 etc., provide the user with some initial information about the components that the user can add to the design space.

Of course, the options provided to the user are not limited to the icons shown, necessarily. For example, the design software can provide the user with other options (not shown) as part of the design program for modifying the type of component 120, 140, 160 etc. In particular, the user may make choices to change the color, material, size, texture, thickness, and so forth of the component.

In any event, FIG. 1A shows that the user selects the receptacle icon 120, and draws a first receptacle 120a in the design space 110, as well as second, third, and fourth receptacles 120(b-d). The user can position the functional components (e.g., 120(a-d)) about or in relation to structural design components. For example, as shown in FIG. 1A, the user can position the receptacles 120(a-d) about or in relation to a wall component 150. The user can create the structural design components by selecting them from a toolbar (or, "selection portion") 102, similar to the functional and source components 120, 140, 160. Alternatively, the user can import the structural design components into the design space from a separate software program, such as for example, a CAD program. According to some implementations of the present invention, the structural design components can be resolvable objects, such as those described in commonly-assigned U.S. patent application Ser. No. 11/204,420, filed Aug. 16, 2005, now U.S. Pat. No. 7,277,830, entitled "Capturing a User's Design Intent with Resolvable Objects," the entire content of which is incorporated by reference herein.

In either case, as the user enters the functional components (e.g., 120(a-d)) into the design space 110 about or in relation to the structural design components (e.g., 150), the software system can receive the input and identify the components. In particular, the software system can identify each component's location, type, size, relationships to other components, etc. Upon identification of the components, the software system can create an intelligent, automatically resolvable object for each component that includes one or more attributes and product parameters. For example, FIG. 1A illustrates an object database 115 comprising objects for each design element (e.g., 120a, 120b, 120c, 160a) in design space 110.

The software system can create and compile such objects in virtually any object-oriented programming language, including, for example, an object-oriented programming language such as the JAVA programming language. However created, the software system can store the objects within a single data structure, and resolve each object (where applicable) in the design to conform to the given design intent. User input at any level of this dataset is thus appropriately propagated to all objects in the data structure consistent with the design intent, thereby resolving the complete design through the resolving of each object individually. These programming objects can include non-functional components as well as functional components, and thus design intents both for physical objects, as well as design intents for non-physical objects or schemes (e.g., wiring, electricity flow directions).

As mentioned above, each object in the object database 115 can include one or more attributes and product parameters, or reference to one or more databases comprising information of the same. Attributes can include product features and characteristics, such as for example, size, shape, color, type, texture, price, material composition, etc. Product parameters can include rules and behaviors associated with each component. For example, the rules and behaviors can include applicable laws, codes, manufacturing guidelines, and physical limitations. For instance, in the case of an electrical system, the product parameters can include the rules and regulations of applicable national, state, and local codes and regulations.

In addition to adding functional components (e.g., 120(a-d)), the user can add one or more source components to the design space 110. For example, FIG. 1A shows that the user selects the power infeed icon 160, and draws a power infeed 160a in the design space 110. Similar to the functional components, the user can position the source components (e.g., 160a) about or in relation to structural design components (e.g., 150). Upon the user entering the source components into the design space 110, or prior thereto, the software system can receive the input and identify the components. In particular, the software system can identify each component's location, type, size, and relationship to other components using object-oriented software processing techniques. Upon identification of the source component, the software system can create an object (e.g., in object database 115) for each source component that includes one or more attributes and product parameters.

Figure 1B:
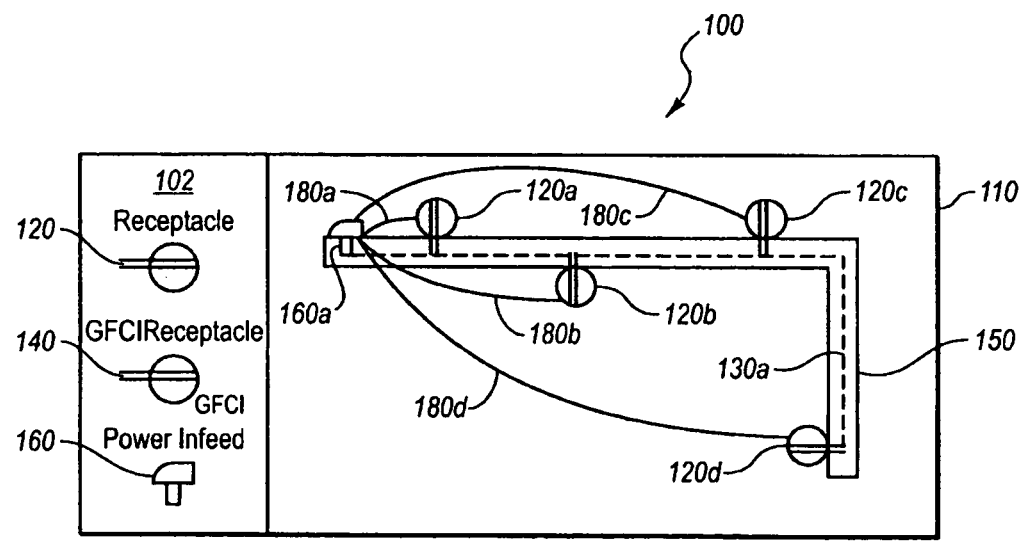
FIG. 1B illustrates a conceptual diagram of the user interface of FIG. 1A in which the design software program automatically populates optimal functional system lines and flow intent lines between functional components in the design space in accordance with an implementation of the present invention.

Upon receiving user input and identifying one or more source components, the software system can automatically populate functional system lines with optimized parameters to power-up the receptacles. The functional system lines can connect the functional components to the source components. For example, FIG. 1B illustrates the interface 110 after the software system has populated a functional system line 130a that interconnects the functional components (e.g., receptacles 120(a-d)) and the source components (e.g., power infeed 160a) in the design space 110. In the electrical case, one will appreciate that the functional system line 130a can include any connecters and conduits, such as jumpers, connection boxes, circuit breakers, etc., needed to properly connect the receptacles 120(a-d) and the power infeed 160a.

One will appreciate that the software system can associate an object (similar to objects in object database 115 described above) to each connector and conduit of the functional system line 130a. Furthermore, the software system can populate the functional system line 130a in view of all of the components within the design space 110 and their associated objects. Thus, the software system can create the functional system line 130a to comply with applicable codes, rules, regulations, manufacturing guidelines, etc.

In addition to complying with applicable codes, rules, regulations, manufacturing guidelines, functional guidelines, etc., the software system can optimize the functional system line 130a. In other words, the software system can optimize the placement, location, number, dimension, type, run, length, cost, etc. of the functional system line 130a and its connectors and conduits. For example, the software system can ensure that the functional system lines are populated in a manner that no one circuit is overloaded (e.g., based on the type of power source), and that each functional component is on a circuit that provides it with the proper amps and voltage, etc.

According to some implementations of the present invention, the wall component 150 can include modular wall components, or modular furniture system components. Furthermore, the connectors and conduits forming the functional system lines 130*a* can comprise pre-fabricated wires, jumpers, and other electrical connectors. In such implementations, the present invention can optimize the functional system lines to correspond to the pre-fabricated electrical components. Thus, the software system can calculate the run of the functional system lines to correspond with known parameters of products.

According to yet further implementations, the software system can automatically populate and optimize the functional system lines with respect to two- or three-dimensions. For example, the software system can optimize the run of the functional system lines in length, width, and height. Thus, the software system can reduce the run of a functional system line by slanting or otherwise angling it as it runs up a wall component or along a floor component where possible, such as within an open cavity within the wall or floor. Furthermore as explained in greater detail below, implementations of the present invention provide the ability to automatically render three-dimensional (3D) views of the functional system lines and other components with the design space, and provide compiled take-offs and pricing for all componentry.

In addition to the creation of functional system lines, the software system can also automatically create flow intent lines. As shown in FIG. 1B, the flow intent lines 180(*a-d*) can visually indicate the connection between each functional component and each source component. For example, flow intent line 180*a* indicates that receptacle 120*a* is connected to power infeed 160*a* through an arched or curved line extending across the design space 110. Flow intent lines 180(*b, c,* and *d*) can similarly indicate the electrical connection of receptacles 120(*b, c,* and *d*).

As shown in FIG. 1B, the flow intent lines 180(*a-d*) can provide a readily visible and easily understandable representation of the electrical connections of the components of the functional system in the design space 110. One will appreciate that the more complex the system, the larger the system, or the more components included in the system, the more difficult it can be for a user to identify the electrical connections between functional components and source components based solely upon the functional system lines.

Figure 1C:
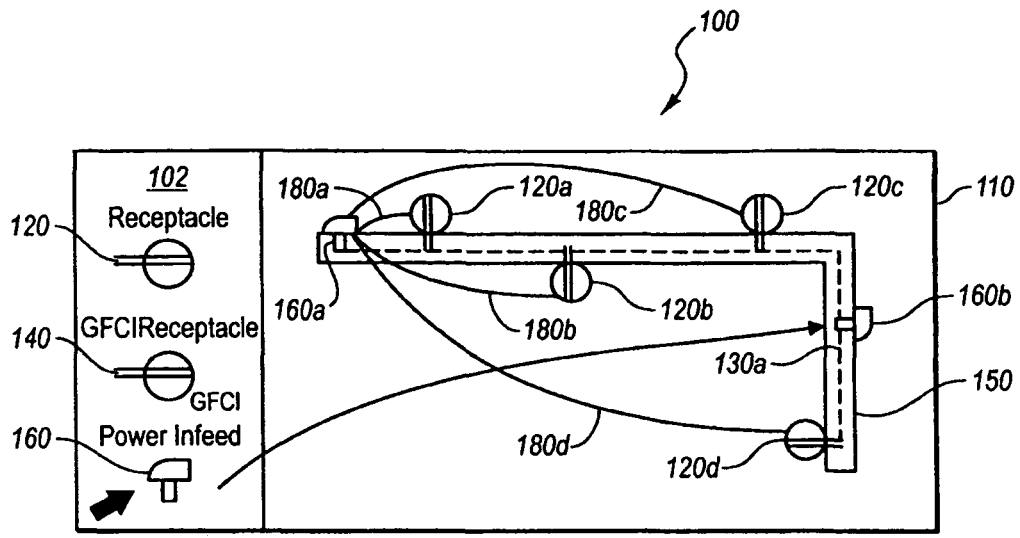
FIG. 1C illustrates a conceptual diagram of the user interface of FIG. 1B when a user enters additional input into the design space in accordance with an implementation of the present invention.

After automatically populating the functional system lines and/or the flow intent lines, a user can place, remove, relocate, or change ef one or more of a non-functional design component, a functional component, or a source component within' the design space. For example, FIG. 1C shows the user positioning an additional power infeed 160*b* into the design space 110. Upon receiving additional user input regarding the placement, removal, relocation, or change of one or more components in the design space, the software system can automatically resolve the functional system lines in view of the additional user input.

Figure 1D:
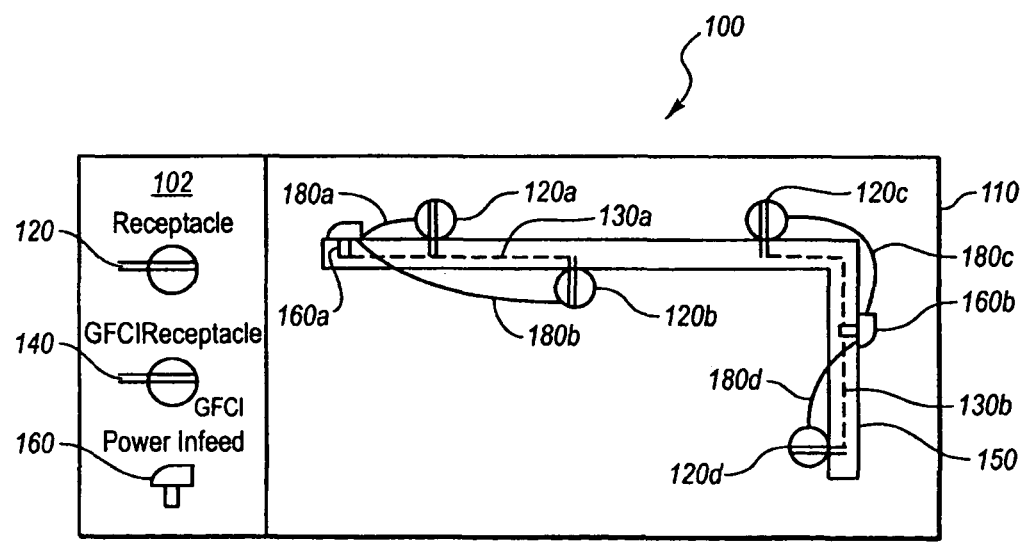
FIG. 1D illustrates a conceptual diagram of the user interface of FIG. 1C in which the design software program automatically resolves the functional system lines in the design space in view of the additional user input in accordance with an implementation of the present invention.

For example, FIG. 1D illustrates that the software system can automatically modify the functional system layout by optimizing the functional system lines in view of the additional source component 160*b*. In particular, the software system can modify the functional system layout to connect each receptacle 120(*a-d*) to the nearest power infeed. Thus, the software system can modify functional system line 130*a* to connect receptacles 120*a* and 120*b* to the power infeed 160*a*. The software system can also create a new functional system line 130*b* to connect receptacles 120*c* and 120*d* to power infeed 160*b*. Thus, as illustrated by FIGS. 1C and 1D, the software system can optimize the functional system lines by, in at least one implementation, reducing the length and number of connectors and conduits connecting the components of the functional system.

Figure 1E:
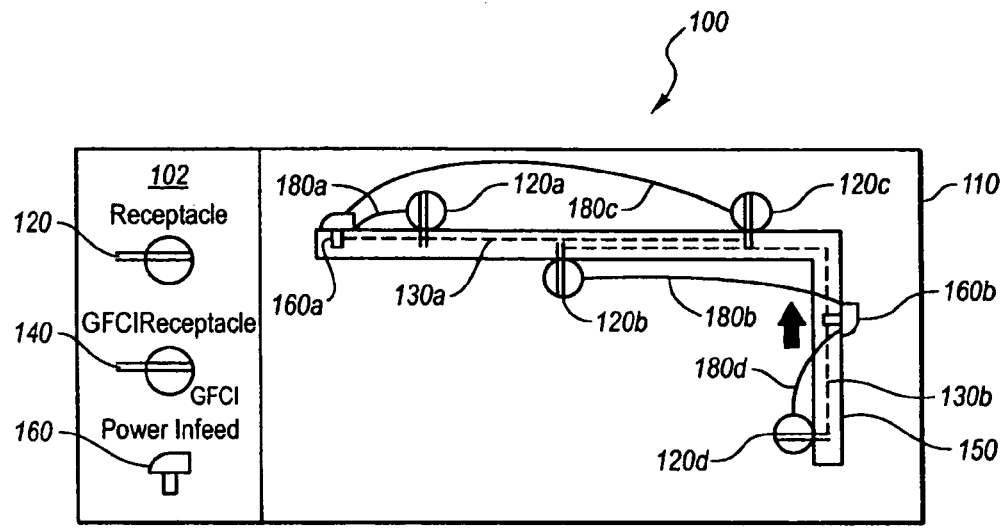
FIG. 1E illustrates a conceptual diagram of the user interface of FIG. 1D when a user manually repositions one or more flow intent lines in accordance with an implementation of the present invention.

One will appreciate in light of the disclosure herein that, if desired, a user can manually perform each step described herein as being automatically performed by the software system (e.g., placement, modification, addition, and removal of functional system lines and flow intent lines). Additionally, the user can manually change any action taken by the software system. For example, FIG. 1E illustrates that the user can reposition one or more of the flow intent lines. This may be desirable for various reasons. For example, the user may want to ensure that all of the receptacles on one side of the wall 150 (or in one workspace, hall, or room etc.) are on one functional system line and all the receptacles on the other side of the wall 150 (or in another workspace, hall, or room etc.).

Thus, as shown in FIG. 1E the user can modify flow intent line 180*b* so it connects receptacle 120*b* with power infeed 160*b*, and modify flow intent line 180*c* so it connects receptacle 120*c* to power infeed 160*a*. Upon receiving user input regarding the repositioning of one or more flow intent lines, the software system can automatically resolve and re-optimize the functional system lines to correspond to the repositioning or modification of the flow intent lines. For example as shown in FIG. 1E, the software system can route functional system line 130*b* to connect receptacles 120*d* and 120*b* to power infeed 160*b*. Similarly, the software system can route functional system line 130*a* to connect receptacles 120*a* and 120*c* to infeed 160*a*.

Figure 2A:
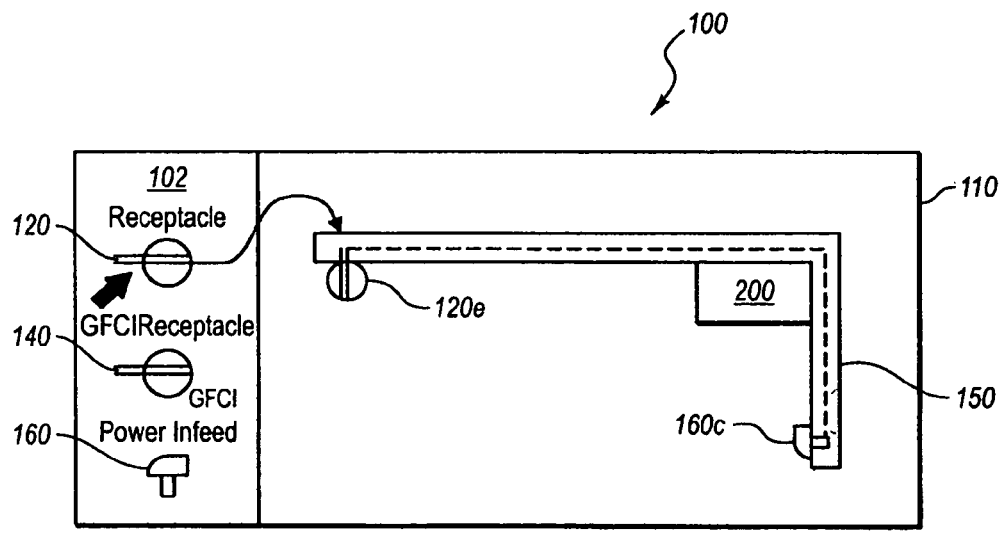
FIG. 2A illustrates a conceptual diagram of a user interface and one or more functional components of a design software program when a user enters input into a design space in accordance with an implementation of the present invention.
Figure 2B:
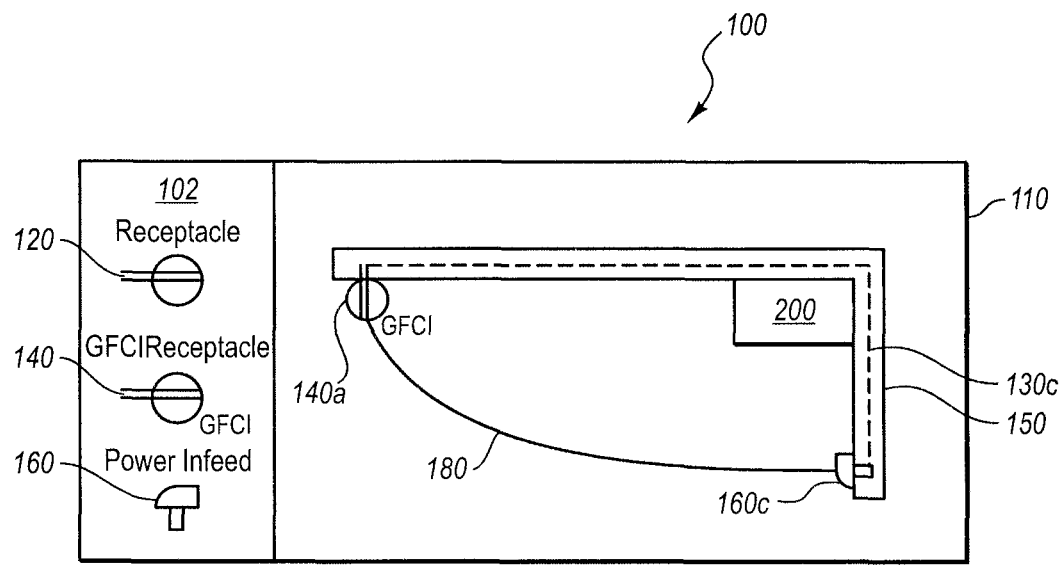
FIG. 2B illustrates a conceptual diagram of the user interface of FIG. 2A in which the design software program automatically resolves any invalid functional components in accordance with an implementation of the present invention.
Figure 2C:
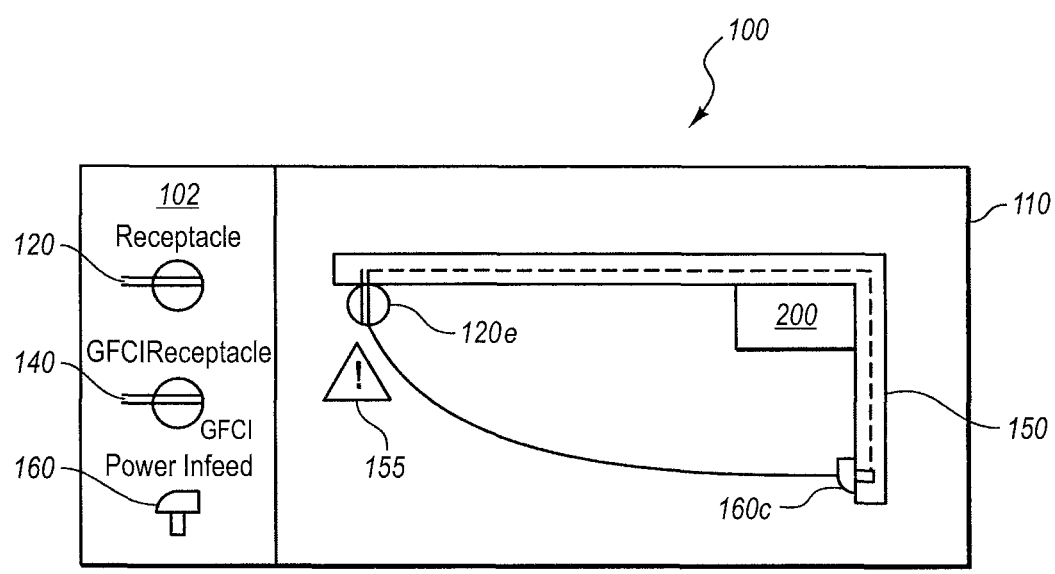
FIG. 2C illustrates a conceptual diagram of the user interface of FIG. 2A in which the design software program warns against placement of an invalid functional component in the design space in accordance with an implementation of the present invention.

FIGS. 2A-2C illustrate additional or alternative features and aspects of the present invention. For example, as seen in FIG. 2A a user can import or design a non-electrical component or set of components such as a wall component 150 or work-surface/panel system in a 2D interface 110 of the software. To create the design, the user can select a component of (e.g., Aluminum Framed Wall) from a product menu, and then draw a line or representative shape in the 2D interface. Upon completion of the line or placement of the shape, the software system can automatically apply default attributes, parameters, and options to all of the component(s). If the user introduces additional components to the existing design, each of the intelligent software objects (including objects for both original components and newly introduced components) automatically resolve themselves (or themselves in conjunction with resolution of other related software objects) in the design, providing a continuously resolved solution at all times.

Thus, when a functional component such as a receptacle 120*e*, or a non-functional design component, is introduced into the design—again through its selection from a product menu—that component can resolve itself upon placement in accordance with the other components in the design space. For example, when placed at or near the desired location, the software system can automatically ensure that the receptacle 120*e* is positioned in a "valid" location.

For example, the software system can constrain the placement of the receptacle 120*e* placed by the user in FIG. 2A. In particular, based on the attributes and parameters of the objects within the design space 110, the software system can ensure that no functional component is placed in an invalid location. For example, the software system can indentify that the user placed a receptacle 120*e* near a sink 200. Based on the parameters of the receptacle, the software system can recognize that only GFCI receptacles 140 can be place proximate a sink 200, and thus identify that the position of the receptacle 120e is invalid.

Upon recognizing or identifying an invalid component, the software system can automatically modify the location, type, connection, or number of the invalid component or other components within the design space 110 to correct the invalid functional component. For example, FIG. 2B illustrates that the software system can change the receptacle 120e to a GFCI receptacle 140a to ensure that the component is valid. FIG. 2B also illustrates that after resolving the design components, the software system can automatically populate functional system line(s) 130c to connect the receptacle 140a and to the power infeed 160c. Additionally, the software system can automatically generate and display a flow intent line 180 connecting the functional components (e.g., 140a) to the source components (e.g., 160c), as explained in greater detail above.

In additional or alternative implementations, however, the software system can also or alternatively warn the user about invalid placement of a component, or automatically move the component to the nearest valid location. For example, FIG. 2C illustrates an interface 100 in accordance with an implementation of the present invention in which the software system generates a warning 155 against placement of a receptacle 120e in an invalid location in the design space 110. Alternatively or additionally, the software system could move the receptacle 120e to the nearest valid location (i.e., far enough away from the sink 200 to comply with the applicable codes/regulations).

In general, the term "valid" can have several different connotations in accordance with the present invention. In one implementation with regard to functional components, for example, the term valid can refer to component compatibility and/or compliance with applicable rules, regulation, and codes. In at least one implementation with regard to electrical receptacles, for example, the term valid can refer to relative component accessibility, such that a valid location would be a location for an electrical receptacle on a wall at minimum floor/ceiling/stud distances, and/or that the electrical outlet is not behind some permanent or semi-permanent fixture (e.g., a wall-mounted cabinet). In other cases, the term "valid" can refer to specific electrical configuration issues with regard to electrical wiring and electricity flow or load balance standards. For example, the software system could constrain (or otherwise warn against) placement of an electrical outlet where there is no intended wiring or electrical sources nearby. Similarly, the software system can constrain or warn against electrical outlets that use the wrong voltage or amperage for a particular appliance, etc.

Additionally, the attributes and parameters of a functional component can include one or more "Option" objects, such as a "Powered/non-powered" Option. Upon placement of the receptacle on the non-electrical component in the design, the software system can recognize the existence (or lack thereof) of a power feed. If there are no power feeds present, the system can automatically set this option to non-powered and the system can display a warning flag (Outlet is not powered).

If a power feed type object does exist in the design, it will also have one or more options such as the "Auto-power Option (On/Off)." A user can drive this option upon placement of a component. When a user places a receptacle in a design with a valid power feed, an object for the receptacle can automatically recognize the status of the Auto-power Option, and automatically resolve itself accordingly, such as by automatically connecting (in the user interface) the receptacle to the power source via one or more functional system lines. If the Auto-power Option of the feed is "Off", the receptacle Non-powered Option may not change; if Auto-power Option of the feed is "On" the receptacle Powered/Non-powered option can be automatically set to Powered. In the same manner, if an "Auto-power On" feed is introduced to a design that previously had no feed, all applicable receptacles switch their Option to Powered, resolving themselves. The placement of an "Auto-power On" feed (or the changing of an Auto-power Off feed to an Auto-power On feed) also can trigger the creation of one or more flow intent lines, which according to some implementations are arc lines represented in the 2D graphic interface to indicate power from the source component to the receptacle.

Implementations of the present invention can also provide a solution level programming object, which recognizes behaviors and relationships between objects within the design, and which allows the software system to resolve itself with each user input. This solution level object recognizes the combined inclusion of the "Auto-power On" feed and receptacle, and understands that this calls for the addition of one or more additional components, such as harnesses or jumpers, to accomplish the power transfer from the power infeed to the receptacles in accordance with the electrical intent. The existence and attributes (dimensional or otherwise) of such harnesses and jumpers and other similar components can also be dependant on the attributes and parameters of the non-functional components within the design space, and they can resolve themselves accordingly.

Thus, when a user introduces an electrical component such as a receptacle into the design—again through its user selection from a product menu—that component can automatically resolve itself in the user interface upon placement in accordance with the electrical intent. Upon placement of the receptacle on a non-electrical component in the design, the receptacle can recognize the existence (or lack thereof) of a power feed. If there are no power feeds present, this option is automatically set to non-powered and a warning flag is displayed (Outlet is not powered).

Figure 3A:
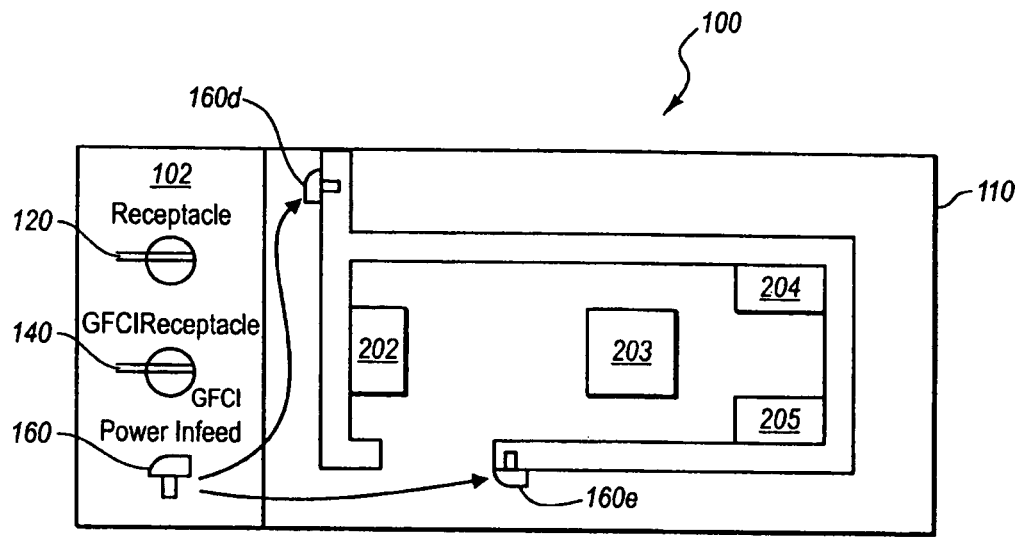
FIG. 3A illustrates a conceptual diagram of a user interface and one or more functional components of a design software program when a user enters input into a design space in accordance with an implementation of the present invention.

As discussed above, according to some implementations of the present invention, a software system can automatically populate functional system lines, automatically populate flow intent lines, and automatically resolve any invalid components with the design space based on object attributes and parameters associated with each component within the design space. Additionally, the software system can automatically place one or more functional components within a design space at valid placement locations. For example, FIG. 3A illustrates a design space 110 in which a user places one or more source components 160c and 160d. One will appreciate at this point the design space does not include any functional components.

Figure 3B:
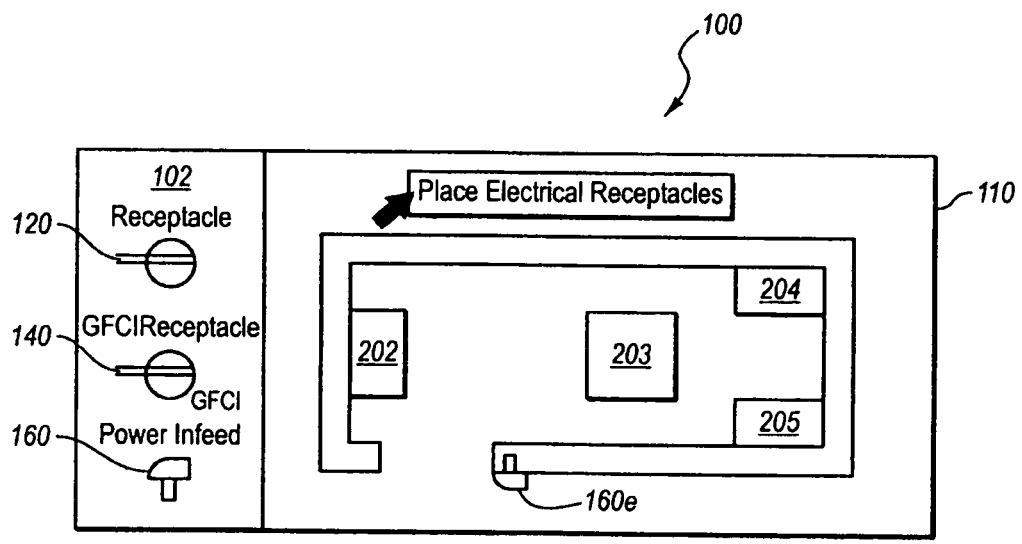
FIG. 3B illustrates a conceptual diagram of the user interface of FIG. 3A when a user requests the design software program to place functional components within the design space in accordance with an implementations of the present invention.
Figure 3C:
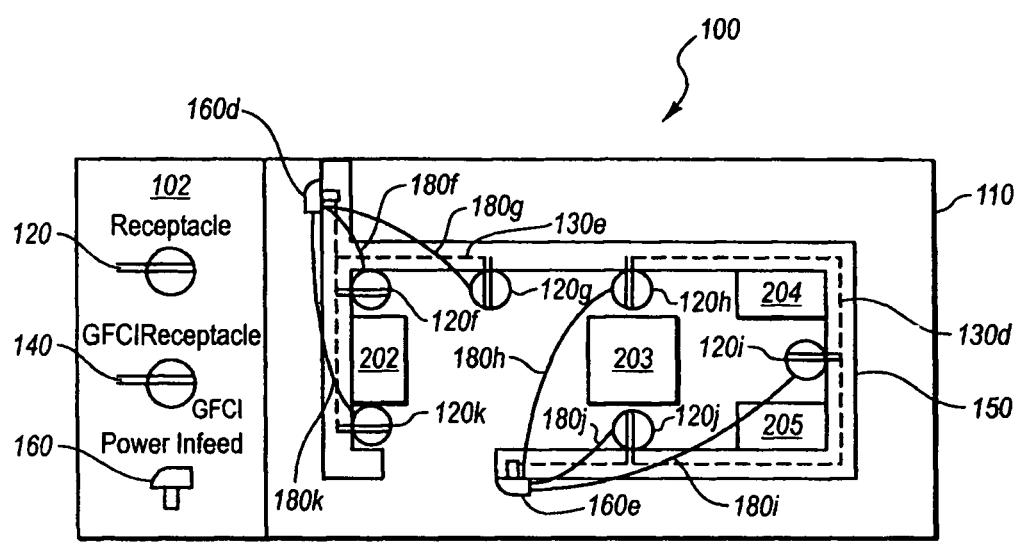
FIG. 3C illustrates a conceptual diagram of the user interface of FIG. 3B in which the design software program automatically and optimally places functional components and functional system lines in the design space in accordance with an implementation of the present invention.

As shown in FIG. 3B, the user can then request the software system to automatically place functional components within the design space. Upon receiving user input regarding one or more functional components (i.e., the request by the user to place functional components), the software system can automatically populate both functional components and functional system lines connecting them. For example, FIG. 3C illustrates that the software system can place a plurality of receptacles 120(f-k) within the design space about a modular wall 105a defining a workspace, and connect them by functional system lines 130(d-e).

One will appreciate in light of the disclosure herein that the placement of the receptacles 120(f-k) can be based on the attributes and parameters of the functional and non-functional components within the design space 110. For example, FIG. 3C illustrates that the software system can ensure that each wall of the workspace has at least one receptacle, that receptacles are placed near desk 203, that receptacles are not placed behind wall mounted furniture 202, 204, and 205, and that the placement of each receptacle is otherwise valid.

Additionally, the software system can automatically populate and optimize functional system lines 130*d*, 130*e* connecting the receptacles 120(*f-k*) with power infeeds 160*d*, 160*e*. Furthermore, the software system can automatically create and place flow intent lines 180(*f-k*) that indicate the flow intent of the functional system layout.

While the interface 100 shown in FIGS. 1A-3C is generally—but not without exception—a two dimensional plan view interface, the software system can also represent components in a three-dimensional interface, in which the a user or the software system can make placement and changes to the design space directly. Specifically, changes in a two-dimensional interface are automatically implemented when pulled up in a three-dimensional interface. This is possible at least in part since all interfaces of the software can utilize the same database, and further since the system has already previously rendered image information associated with each component that the user selects within the interface 110. As such, the software system can represent a single dataset as two-dimensional and three-dimensional graphical representations instantly and interchangeable, as well as represent textual representations.

As a result, auditing between the various outputs is not ordinarily required. Rather, validation of the design in one view confirms accuracy of the design in the other views as well. This means that pricing and product take-off lists are also accurate due to the elimination of any additional human adjustments or guesses that would otherwise need to be made based on the graphical views.

At any time before, during, or after design layout of any componentry, a user can open a separate 3D interface or textual interface (a Bill of Materials, Order Proposal, parts list, reports, etc.). For example, the present invention can include additional and alternative systems and methods for displaying automatically resolved user input in two or more dimensional views in a realistic manner. Such systems and methods are described in commonly-assigned U.S. patent application Ser. No. 11/204,419, filed Aug. 16, 2005, now U.S. Pat. No. 7,249,005, entitled "Design software incorporating efficient 3-D rendering." The entire contents of the U.S. Pat. No. 7,249,005 are incorporated by reference herein.

Similarly, the present invention can include additional and alternative systems and methods for the continual generation of an accurate parts list along with the user input, which the software system can display in a parts list interface, and which does not need further review for correction or additional parts before ordering. Such systems and methods are described in commonly-assigned, and above referenced, U.S. patent application Ser. No. 11/204,421, filed on Aug. 16, 2005, entitled "Capturing a User's Intent in Design Software."

Upon the opening of a 3D or textual interface (and dynamically in unison with additional user input) the system can automatically represent the design components by 3D or textual depiction in the appropriate interface. According to some implementations of the present invention, the 3D rendering or depiction of the design space can include flow intent lines that visually show the connection of each functional component to a source component. Alternatively, the flow intent lines can be hidden or not created in the 3D rendering to allow the most accurate representation of how the design space will look when constructed. Additionally or alternatively, according to some implementations of the present invention, the user can activate or deactivate the flow intent lines. Thus, a user can decide whether the flow intent lines are created and displayed in either the 2D or 3D interface.

One will appreciate in light of the disclosure herein that the 2D, 3D, and textual interfaces can update accordingly with each user input, as each design component and/or functional system line resolves itself. Other non-physical component objects, such as, but not limited to, a product price, will also resolve themselves in accordance with related objects, and the system may or may not represent them in one or more of the graphical or textual interfaces.

Thus, a user could create a space only superficially in a three-dimensional view and, for example, place one or more functional components, such as electrical receptacles, in the design space. The software system can then automatically move the functional components into an appropriate or valid location (if necessary) based on the location of a source component or any other components in the design space. After ensuring the all components are in valid locations and configurations, the software system can connect only the appropriate conduits and connectors between the source component and the functional components.

The software system can further automatically maintain an ongoing, accurate parts list that lists each functional component, each conduit and connector, and each source component that would may be required to produce a valid, optimized functional system layout. For example, in the case of an electrical system layout, the software system can maintain an ongoing, accurate parts list including each receptacle component, each wire (by specific dimension in terms of gauge, inches, feet, etc.), each power source, and any other jumpers, connectors, or other components needed. Thus, the user can have confidence that, should they submit an order for the three-dimensional design the user has just made, that all diagrams, dimensions, and components submitted to any entity with the order will be appropriate and up to applicable or chosen electrical code(s) and guidelines.

Figure 4:
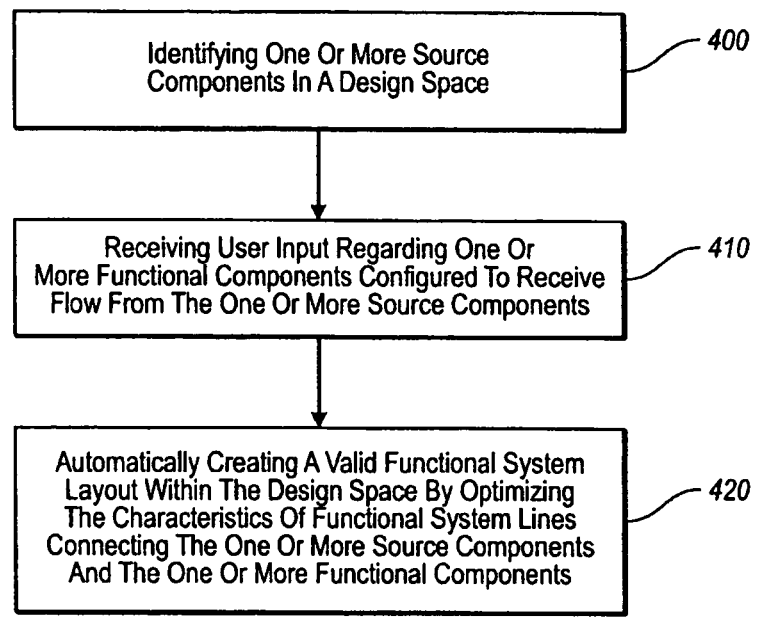
FIG. 4 illustrates a flowchart of a series of acts in a method in accordance with an implementation of the present invention of designing a valid functional system layout within the design space.
Figure 5:
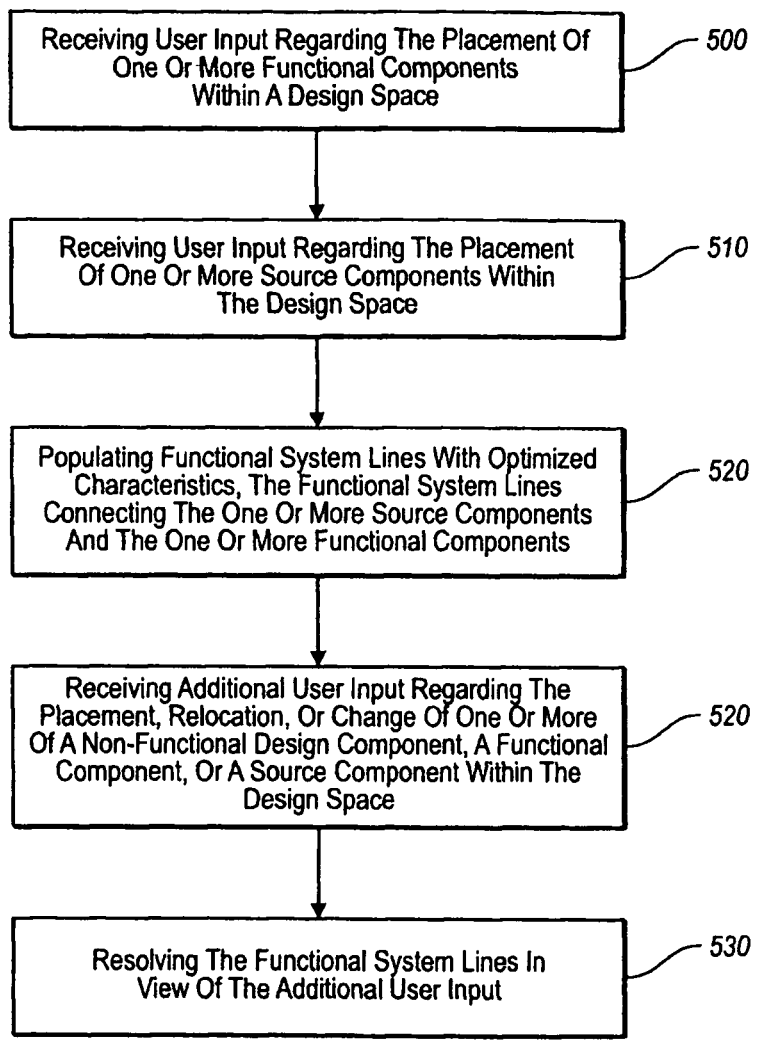
FIG. 5 illustrates a flowchart of a series of acts in a method in accordance with another implementation of the present invention of designing a valid functional system layout within the design space.

In addition to the foregoing, implementations of the present invention can also be described in terms of flowcharts comprising one or more acts in a method for accomplishing a particular result. For example, FIG. 4 illustrates a method of automatically configuring user input in a computerized environment to create a valid functional system layout. Similarly, FIG. 5 illustrates a method of automatically configuring user input in a computerized environment to populate functional system lines between functional components and source components. The acts of FIGS. 4 and 5 are discussed more fully below with respect to the components and diagrams of FIGS. 1A-3C.

For example, FIG. 4 shows that a method in accordance with an implementation of the present invention can comprise an act 400 of identifying one or more source components in a design space. Act 400 can include identifying the location and/or object attributes and parameters of the source components in the design space. For example, as shown in FIG. 1A, the interface 100 can receives one or more inputs from a user into the design space regarding a source component (e.g., power infeed 160*a*). Similarly, FIG. 1C shows that the interface 100 receives user input regarding the location of an additional source component (e.g., power infeed 160*b*) placed within the design space 110.

FIG. 4 also shows that a method in accordance with an implementation of the present invention can comprise an act 410 of receiving user input regarding one or more functional components configured to receive flow from the one or more source components. Act 410 can include receiving input from a user that corresponds to placing, removing, repositioning, or changing one or more functional components within the design space. For example, FIG. 1A shows the interface 100 receives user input regarding positioning a functional component (e.g., electrical receptacle 120*a*) within the design space 110. Alternatively, act 410 can comprise receiving input from a user requesting placement of functional components within a design space. For example, FIG. 3B shows the interface 100 receiving user input requesting the placement of functional component (e.g., electrical receptacles) within the design space 110.

In addition, FIG. 2 shows that a method in accordance with an implementation of the present invention can comprise an act 420 of automatically creating a valid functional system layout within the design space by optimizing the parameters of functional system lines connecting the one or more source components and the one or more functional components. Act 420 can include populating and optimizing the placement, location, number, dimension, type, and/or length of functional system lines connecting the one or more functional components and one or more source components in a design space. For example, FIG. 1B shows the interface 100 automatically placing functional conduits and connectors 130*a* between a source component (e.g., power infeed 160*a*) and the functional components (e.g., electrical receptacles 120(*a*-*d*)). Act 420 can also include adding, removing, or modifying functional conduits and connectors between functional components. For example, FIG. 1D, shows the interface 100 modifying the functional conduits and connectors 130*a*, and adding functional conduits and connectors 130*b*.

By contrast, FIG. 5 illustrates that an additional or alternative method in accordance with an implementation of the present invention can comprise an act 500 of receiving user input regarding the placement of one or more functional components within a design space. Act 500 can include receiving user input with regard to placing, removing, or changing the placement of functional components within a design space. For example, FIG. 1A shows the interface 100 receiving user input indicating the placement of functional components (e.g., electrical receptacles 120(*a-d*)) within the design space 110.

FIG. 5 also shows that a method in accordance with an implementation of the present invention can comprise an act 510 of receiving user input regarding the placement of one or more source components within the design space. Act 510 can include receiving user input with regard to placing, removing, or changing the placement of source components within a design space. For example, FIG. 1A shows the interface 100 receiving input from a user positioning a source component (e.g., power infeed 160*a*) within the design space 110. Alternatively, as shown in FIG. 1C, the interface 100 can receive user input regarding the placement of an additional source component (e.g., power infeed 160*b*) within the design space 110.

In addition, FIG. 5 shows that a method in accordance with an implementation of the present invention can comprise an act 520 of populating functional system lines with optimized characteristics, the functional system lines connecting the one or more source components and the one or more functional components. Act 520 can include populating and optimizing the placement, location, number, dimension, type, and/or length of functional system lines connecting the one or more functional components in a design space. For example, FIG. 1B shows that interface 100 automatically places functional conduits and connectors 130*a* between a source component (e.g., power infeed 160*a*) and functional components (e.g., electrical receptacles 120(*a-d*)).

Furthermore, FIG. 5 shows that the method in accordance with an implementation of the present invention can comprise an act 530 of receiving additional user input regarding the placement, relocation, or change of one or more of a non-functional design component, a functional component, or a source component within the design space. Act 530 can include receiving additional user input that can change or modify any of the design components within the design space, or add additional ones. For example, FIG. 1C shows the interface 100 can receive user input regarding the placement of an additional source component (e.g., power infeed 160*b*) within the design space 110.

Still further, FIG. 5 shows a method in accordance with an implementation of the present invention can comprise an act 540 of resolving the functional system lines in view of the additional user input. Act 540 can include adding, removing, or modifying functional system lines in view of the additional user input to maintain validity and optimization of the functional system layout. For example, FIG. 1D shows the interface 100 modifying the functional conduits and connectors 130*a*, and adding functional conduits and connectors 130*b*.

Accordingly, the diagrams and methods provided herein illustrate a number of ways and configurations in which design software can automatically adjust prior, present, and/or future user inputs to create an accurate depiction of a design space. In particular, the design software in accordance with the present invention can continually resolve user input, as well as to continually resolve appropriate positioning of user input in real-time. Furthermore, the design software in accordance with the present invention can accomplish these ends while maintaining an accurate parts list for each of the items placed in a given design space. Thus, implementations of the present invention can represent an effective and efficient means for designing any interior and/or exterior space, and ultimately for constructing the same.

The embodiments of the present invention may comprise a special purpose or general-purpose computer including various computer hardware components, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer.

By way of example, and not limitation, such computer-readable media can comprise RAM, DRAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. In a computer system, a computer-implemented method for configuring a design space by automatically integrating both functional and non-functional design components which are defined by component parameters and attributes, the computer-implemented method of the system comprising:
   storing in a database
      a plurality of different non-functional product components to be used in designing an interior workspace, each non-functional product component being defined by (i) associated parameters that define each type of non-functional product component, and (ii) attributes that are defined by rules, characteristics and behaviors of each non-functional product component and any associated hardware for connecting or providing structural support for each type of non-functional product component;
      a plurality of different functional components defining types of outlets for various functional systems providing at least one or more services consisting of electrical power, HVAC, water and gas for distribution and use within the design space, the functional components being defined by (i) associated parameters that define each type of functional component, and (ii) attributes that are defined by rules, characteristics and behaviors of each functional component and any associated hardware for providing functional system lines required for delivery and distribution of any such services to the interior workspace for each type of functional component; and
      a plurality of source components defining types of inlets for the various functional systems providing the at least one or more services, each source component being defined by (i) associated parameters that define each type of source component, and (ii) attributes that are defined by rules, characteristics and behaviors of each source component and any associated hardware for connecting or providing structural support for each type of source component;
   inputting at a graphical user interface (GUI) of the system
      a design space and indentifying within the design space a first non-functional product component that is to be placed within an indicated region of the design space defined by a starting and an end point;
   a system processor thereafter retrieving from the database the identified first non-functional product component and automatically replicating the first non-functional product component in a manner that fits the first non-functional product component to the indicated region of the design space, including automatically populating the indicated region of the design space with any required hardware for connecting or providing structural support to the replicated non-functional product components required to fit the first non-functional product component within the indicated region of the design space;
   identifying and inputting at the GUI one or more functional components for one or more types of outlets for the functional systems that are to provide the one or more services for use and distribution within the design space;
   identifying and inputting at the GUI one or more source components for one or more types of inlets for the functional systems that are to provide the one or more services for use and distribution within the design space; and
   the system processor thereafter retrieving from the database the identified functional and source components and automatically populating the design space with functional system lines integrated into the non-functional product components in the design space, the functional system lines being required for delivery and distribution of one or more of the services from each source component inlet to one or more functional component outlets for a corresponding type of service, and said system processor also automatically populating each functional system line with any required hardware required for the functional system line.

2. The method as recited in claim 1, further comprising:
   modifying the layout of the design space by identifying and inputting at the GUI of the system one or more additional functional components for one or more types of outlets or one or more additional source components for one or more types of inlets, or one or more non-functional product components and
   the system processor thereafter re-configuring the layout of the design space to incorporate the additional functional components, source components or non-functional product components and automatically re-populating the layout of the design space with either updated functional system lines based on the additional functional or source components, or automatically re-populating the layout of the design space with any required hardware for connecting or providing structural support for the additional non-functional product components, as applicable.

3. The method as recited in claim 1, wherein automatically populating the design space layout with functional system lines comprises automatically generating functional system lines that are in compliance with applicable codes, rules, and manufacturing guidelines.

4. Currently Amended) The method as recited in claim 1, wherein the system processor optimizes the characteristics of functional system lines by optimizing the placement of the functional system lines relative to the non-functional product components.

5. The method as recited in claim 4, wherein optimizing the characteristics of functional system lines comprises calculating an optimal run of connectors and conduits between the one or more functional source components and the one or more functional components for one or more types of outlets.

6. The method as recited in claim 1, wherein the system processor automatically populates flow intent lines in the layout of the design space, the flow intent lines indicating connections between one or more functional components and one or more source components.

7. The method as recited in claim 6, further comprising:
   receiving user input at the GUI regarding the repositioning of one or more flow intent lines; and
   the system processor resolving the optimized functional system lines to correspond with the repositioning of the one or more flow intent lines.

8. The method as recited in claim 1, wherein the system processor automatically creates a valid functional system layout by automatically resolving any invalid functional components or invalid source components.

9. The method as recited in claim 8, automatically resolving any invalid functional components or invalid source components comprises modifying the location, type, connection, or number of any invalid functional components or invalid source components.

10. The method as recited in claim 1, wherein the system processor generates a parts list in real-time including all the components for all functional system lines generated, and updates an applicable parts list in real-time when any changes are made to the one of the functional system lines for the design space layout.

11. The method as recited in claim 1, wherein the system processor renders the layout of the design space, including non-functional product components, functional components for functional system inlets, source components for functional system outlets, and functional system lines in 2D graphics, 3D graphics, and textual information, each of which are separate representations of a common dataset.

12. In a computer system, a computer-implemented method for configuring a design space with a functional system layout by automatically integrating design components consisting of both functional and source components which are defined by component parameters and attributes, the computer-implemented method comprising:
   storing in a database
      a plurality of different functional components types of outlets for various functional systems providing at least one or more services consisting of electrical power, HVAC, water and gas for distribution and use within the design space, the functional components being defined by (i) associated parameters that define each type of functional component, and (ii) attributes that are defined by rules, characteristics and behaviors of each functional component and any associated hardware for providing functional system lines required for delivery and distribution of any such services to the interior workspace for each type of functional component; and
      a plurality of source components defining types of inlets for the various functional systems providing the at least one or more services, each source component being defined by (i) associated parameters that define each type of source component, and (ii) attributes that are defined by rules, characteristics and behaviors of each source component and any associated hardware for connecting or providing structural support for each type of source component;
   inputting at a graphical user interface LGUI) of the system a design space and indentifying within the design space one or more functional components for one or more types of outlets for the functional systems that are to provide the one or more services for use and distribution within the design space;
   identifying and inputting at the GUI of the system one or more source components for one or more types of inlets for the functional systems that are to provide the one or more services for use and distribution within the design space;
   a system processor thereafter configuring a functional system layout for the design space by retrieving from the database the identified functional and source components and automatically populating the design space with functional system lines required for delivery and distribution of one or more of the services from each source component inlet to one or more functional component outlets for a corresponding type of service, including automatically populating each functional system line with any required hardware for the functional system line;
   modifying the functional system layout by identifying and inputting at the GUI of the system one or more additional functional components for one or more types of outlets or one or more additional source components for one or more types of inlets; and
   the system processor thereafter re-configuring the functional system layout to incorporate the additional functional or source components and automatically re-populating the design space with updated functional system lines based on the additional functional or source components.

13. The method as recited in claim 12, wherein the system processor automatically creates a valid functional system layout by automatically resolving any invalid functional components or invalid source components when re-configuring the functional system layout.

14. The method as recited in claim 12, wherein the system processor generates a warning upon receiving user input that positions one or more functional components or one or more source components at an invalid location.

15. The method as recited in claim 12, wherein the system processor optimizes the characteristics of functional system lines by optimizing the placement of the functional system lines relative to the non-functional product components.

16. The method as recited in claim 12, wherein the system processor automatically populates flow intent lines in the layout of the design space, the flow intent lines indicating connections between one or more functional components and one or more source components.

17. The method as recited in claim 12, further comprising, inputting at the GUI one or more changes to the design space, the one or more changes comprising the placement, relocation, or change of one or more of a non-functional product component, a functional component, or a source component within the design space; and
   the system processor thereafter resolving one or more of the functional system lines in order to account for said one or more input changes to the design space.

18. The method of claim 12 further comprising a non-volatile memory medium for storing computer-executable instructions which, when down loaded to the computer system, cause the computer-implemented method to be executed by the computer system.

19. The method of claim 1 further comprising a non-volatile memory medium for storing computer-executable instructions which, when down loaded to the computer system, cause the computer-implemented method to be executed by the computer system.

20. A computer system for configuring a design space by automatically integrating both functional and non-functional design components which are defined by component parameters and attributes, the computer system comprising:
   (a) a database having stored therein
      a plurality of different non-functional product components to be used in designing an interior workspace, each non-functional product component being defined by (i) associated parameters that define each type of non-functional product component, and (ii) attributes that are defined by rules, characteristics and behaviors of each non-functional product component and any associated hardware for connecting or providing structural support for each type of non-functional product component;

a plurality of different functional components defining types of outlets for various functional systems providing at least one or more services consisting of electrical power, HVAC, water and gas for distribution and use within the design space, the functional components being defined by (i) associated parameters that define each type of functional component, and (ii) attributes that are defined by rules, characteristics and behaviors of each functional component and any associated hardware for providing functional system lines required for delivery and distribution of any such services to the interior workspace for each type of functional component; and a plurality of source components defining types of inlets for the various functional systems providing the at least one or more services, each source component being defined by (i) associated parameters that define each type of source component, and (ii) attributes that are defined by rules, characteristics and behaviors of each source component and any associated hardware for connecting or providing structural support for each type of source component;

(b) a graphical user interface (GUI) of the system for inputting a design space and for inputting and indentifying within the design space a first non-functional product component that is to be placed within an indicated region of the design space defined by a starting point and an end point;

inputting and identifying within the design space one or more functional components for one or more types of outlets for the functional systems that are to provide the one or more services for use and distribution within the design space; and inputting and identifying within the design space one or more source components for one or more types of inlets for the functional systems that are to provide the one or more services for use and distribution within the design space; and (c) a system processor programmed to retrieve from the database the identified first non-functional product component and automatically replicate the first non-functional product component in a manner that fits the first non-functional product component to the indicated region of the design space, including automatically populating the indicated region of the design space with any required hardware for connecting or providing structural support to the replicated non-functional product components required to fit the first non-functional product component within the indicated region of the design space;

retrieve from the database the identified functional and source components and automatically populate the design space with functional system lines integrated into the non-functional product components in the design space, the functional system lines being required for delivery and distribution of one or more of the services from each source component inlet to one or more functional component outlets for a corresponding type of service; and automatically populate each functional system line with any required hardware required for the functional system line.

21. A computer system for configuring a design space by automatically integrating both functional and non-functional design components which are defined by component parameters and attributes, the computer system comprising:

(a) a database having stored therein a plurality of different functional components defining types of outlets for various functional systems providing at least one or more services consisting of electrical power, HVAC, water and gas for distribution and use within the design space, the functional components being defined by (i) associated parameters that define each type of functional component, and (ii) attributes that are defined by rules, characteristics and behaviors of each functional component and any associated hardware for providing functional system lines required for delivery and distribution of any such services to the interior workspace for each type of functional component; and a plurality of source components defining types of inlets for the various functional systems providing the at least one or more services, each source component being defined by (i) associated parameters that define each type of source component, and (ii) attributes that are defined by rules, characteristics and behaviors of each source component and any associated hardware for connecting or providing structural support for each type of source component;

(b) a graphical user interface (GUI) for inputting a design space and indentifying within the design space one or more functional components for one or more types of outlets for the functional systems that are to provide the one or more services for use and distribution within the design space; and one or more source components for one or more types of inlets for the functional systems that are to provide the one or more services for use and distribution within the design space; and (c) a system processor programmed to retrieve from the database the identified functional and source components and automatically populate the design space with functional system lines required for delivery and distribution of one or more of the services from each source component inlet to one or more functional component outlets for a corresponding type of service;

automatically generate a functional system layout for the design space by populating each functional system line with any required hardware for the functional system line; and automatically update functional system lines and re-populate any updated functional system line with any required hardware for any additional functional or source components added to the functional system layout after it is first generated.

* * * * *

UNITED STATES PATENT AND TRADEMARK OFFICE
CERTIFICATE OF CORRECTION

PATENT NO. : 8,762,877 B2  
APPLICATION NO. : 12/444890  
DATED : June 24, 2014  
INVENTOR(S) : Loberg et al.

Page 1 of 1

It is certified that error appears in the above-identified patent and that said Letters Patent is hereby corrected as shown below:

In the Specification

Column 9
Line 51, change "change ef one" to --change of one--
Line 53, change "within'" to --within--

Column 11
Line 1, change "be place" to --be placed--

Column 13
Line 14, change "the a user" to --the user--

Column 14
Line 18, change "ensuring the all" to --ensuring that all--
Line 25, change "would may be" to --may be--

Column 18
Line 45, remove "Currently Amended)"

In the Claims

Column 19
Line 12, change "to the one of the" to --to one of the--
Line 50, change "LGUI)" to --(GUI)--

Signed and Sealed this
Thirtieth Day of June, 2015

Michelle K. Lee
*Director of the United States Patent and Trademark Office*